United States Patent [19]

Lord et al.

[11] Patent Number: 4,982,446
[45] Date of Patent: Jan. 1, 1991

[54] BIT SYNCHRONIZATION FOR OPTICAL NETWORKS

[75] Inventors: Andrew Lord, Felixstowe; Lutz C. Blank, Colchester, both of England

[73] Assignee: British Telecommunications, London, England

[21] Appl. No.: 217,781

[22] Filed: Jul. 12, 1988

[30] Foreign Application Priority Data

Jul. 16, 1987 [GB] United Kingdom ............... 8716749

[51] Int. Cl.$^5$ .................. H04B 10/16; H04L 12/00
[52] U.S. Cl. ................................. 455/606; 455/601;
455/608; 371/47.1
[58] Field of Search ............. 455/601, 605, 606, 608,
455/612, 600; 371/46, 47.1

[56] References Cited

U.S. PATENT DOCUMENTS 4,642,806  2/1987  Hewitt et al. ..................... 370/103

Primary Examiner—Herbert Goldstein
Assistant Examiner—L. Van Beek
Attorney, Agent, or Firm—Nixon & Vanderhye

[57] ABSTRACT

A submarine optical telecommunications system has two shore based transmitting stations whose signals are combined at a passive, submerged junction. Phase errors are caused by variations in transmission times to the junction. An error signal is generated at the first repeater after the junction. The error signal, which represents the phase errors, is transmitted to a shore station where it is used to adjust the sending phase. A surface acoustic wave filter tuned to half the frequency of the combined signal is the preferred way to generate the error signal.

8 Claims, 2 Drawing Sheets

BIT SYNCHRONIZATION FOR OPTICAL NETWORKS

FIELD OF THE INVENTION

This invention relates to bit synchronisation in optical networks and especially to networks which are submerged in the ocean. It is utilised in conjunction with systems in which the signals take the form of pulses of radiation separated by intervals in which there is no radiation.

BACKGROUND OF THE INVENTION

Most submarine cables have only two terminal points, i.e. one at each end. However, the high capacity of optical systems makes it possible for a submarine cable, e.g. a transatlantic or transpacific cable, to serve a very large land area and it may be convenient to provide a plurality of terminal points connected by submerged optical cables to submerged optical junctions (which have a plurality of input fibres and one output fibre).

In order to keep submerged equipment as simple as possible, it has been proposed that the junctions are all passive. That is the output is simply a concatenation of the various inputs with phase and amplitude relationships preserved. It is, therefore, important that input pulses should not co-incide, i.e. it is important that phase relationships at the junction be correct.

The transmitters may be widely separated geographically but, even in these circumstances, a fixed phase relationship could be established. However, the relationship at the junction involves the transmission times along the optical fibres to the junction. The fibres are subjected to the ambient temperatures of the sea and therefore the temperature varies, e.g. diurnal and seasonal variations. The refractive index, and hence the speed of transmission, is dependent on temperature. Thus phase relationships at a junction cannot be controlled only from the transmitters.

SUMMARY OF THE INVENTION

According to this invention the spacing uniformity is measured after a junction, e.g. at the first repeater after a junction, and error signals representing the mis-match are returned to a transmitter which adjusts its sending phase, e.g. by adjusting a phase delay, so as to reduce the error indicated by the signal.

In the preferred embodiment there are two input fibres and one output fibre at a junction. The two input signals, i.e. one in each of the two input fibres, have the same bit rates. The bits in the output are interleaved because one input has a "mark" while the other has a "space". In this embodiment the error detector conveniently takes the form of a filter having a narrow pass band located at half the bit rate of the combined signal, i.e. at the bit rate of each of the two input signals. When the composite signal consists of uniformly spaced pulses the output of the filter is at a minimum. When the spacing becomes non-uniform the output of the filter rises. The output of the filter is returned to the transmitters, e.g. it is periodically converted into digital form and returned to the transmitters.

One transmitter is designated as "fixed phase" and the other as "adjustable phase". The adjustable transmitter includes adjustable phase delay means for its signals. Thus the transmitter receives error signals indicating a phase error and the phase delay is adjusted to minimise the error signals.

BRIEF DESCRIPTION OF THE DRAWINGS

The invention will now be described by way of example with reference to the accompanying diagrammatic drawings in which.

DETAILED DESCRIPTION OF THE DRAWINGS

Figure 1:
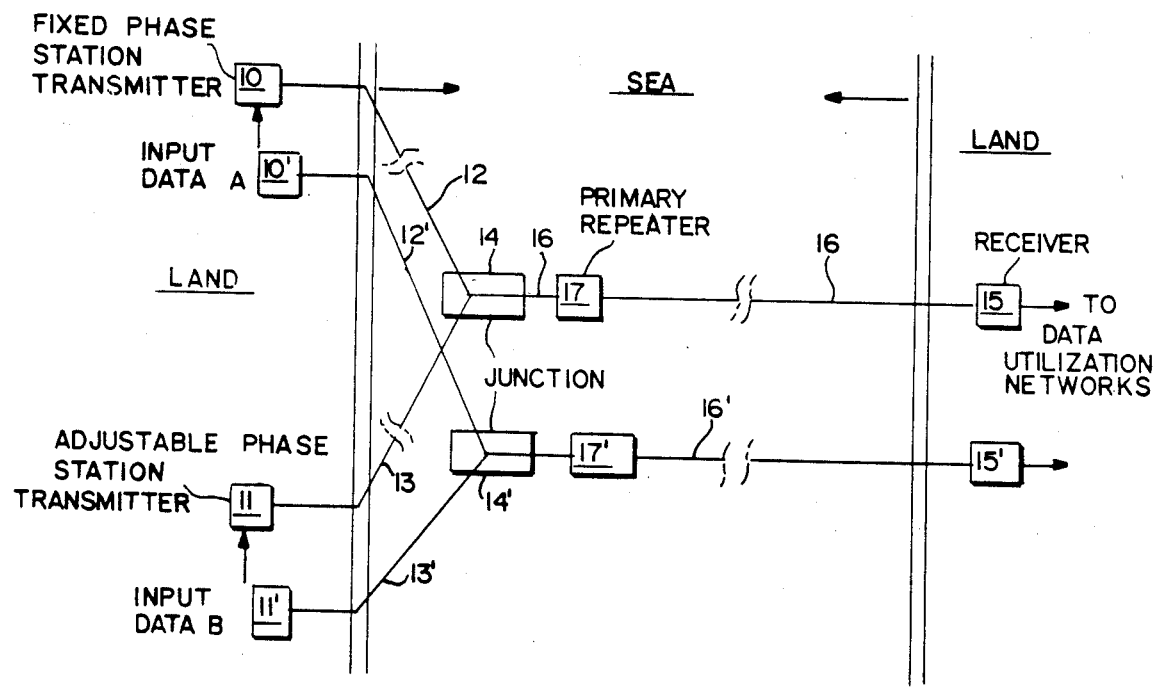
FIG. 1 illustrates the invention as applied to a submarine network, including a submerged junction and a submerged repeater.

The network shown in FIG. 1 illustrates two land-based transmitters, namely a "fixed phase" station 10 and an "adjustable phase" station 11 connected via submerged optical fibres 12 and 13 to a junction 14. The junction 14 is connected to a land-based receiver 15 by a fibre 16. It is to be understood that the fibres 12, 13, 16 are comprised in cables (not shown). The system also includes repeaters at suitable distances, e.g. about 50–100 miles, but only one of these is shown in FIG. 1. This is primary repeater 17 which is the first repeater after junction 14. Repeater 17 comprises monitoring equipment which is utilised to control the phase at the adjustable station 11; there are the major features of the invention and they will be described below. The wave form is retimed at a repeater and it is important that the phase errors be measured before any retiming takes place.

The signals in optical fibres 12 and 13 are return-to-zero signals which take the form of pulses of radiation separated by intervals when no radiation is present. The standard intervals are the same length as the pulses. The junction 14 is an optical directional coupler. The output in fibre 16 is a non-return-to-zero signal which is the sum of the input signals. The timing relationships are preserved.

Figure 2:
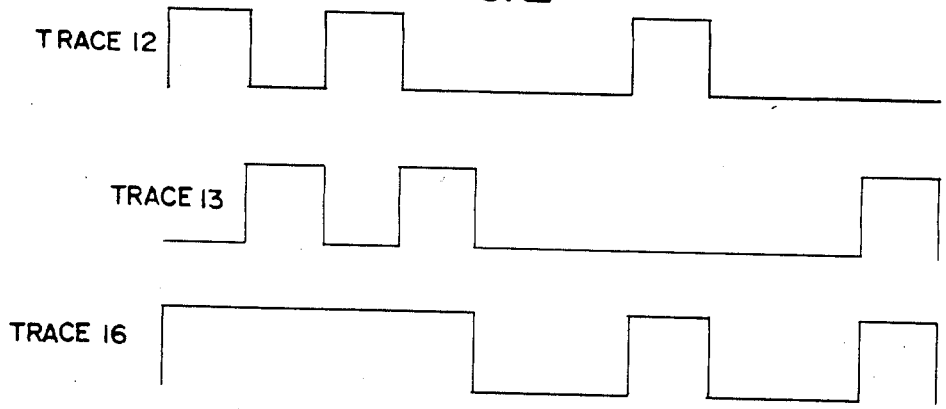
FIG. 2 illustrates idealised wave forms before and after the junction shown in FIG. 1.

FIG. 2 shows idealised signal timings. Trace 12 illustrates the pulses arriving from "fixed phase" station 10 on fibre 12; trace 13 represents the pulses arriving from "adjustable phase" space 11 on fibre 13. The synchronisation of the variable station 11 is adjusted so that, in perfect operation, the two trains are perfectly out of phase. Thus the signal in the output fibre 16 is as shown in trace 16.

Figure 3:
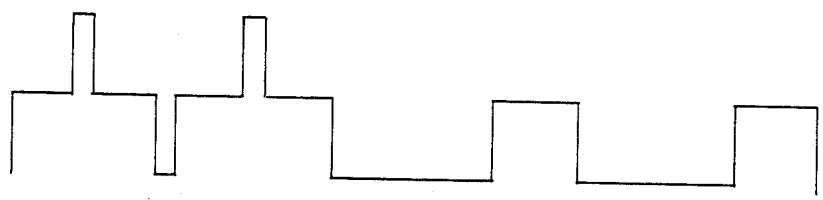
FIG. 3 illustrates an unevenly spaced wave form caused by phase errors.

However, because the transition times of the signals are not constant, the combined signal sometimes becomes uneven as illustrated in FIG. 3. The unevenness is due to variations in both paths 12 and 13. Although both stations 10 and 11 contribute to the unevenness, only one station, i.e. 11, includes means of adjustment to keep the pulses evenly spaced (as shown in Trace 16). The arrangements for correcting the spacing are distributed between repeater 17 and station 11.

Most of the repeater is conventional. It comprises detector circuit 40 which receives light signals from fibre 16, converts them to electrical signals, amplifies and shapes them. The output of the repeater is provided by laser circuit 41 which is adapted to provide signals conforming to system specification.

Laser circuit 41 is controlled by discriminator 42 which receives signals from detector circuit 40 and a clock signal from filter 43. This is a conventional arrangement which is adapted to regenerate a new signal which replicates the input signal. Filter 43 is a narrow band pass filter, e.g. a surface acoustic wave filter, tuned to the frequency equivalent to the bit rate of the combined signal. As has been mentioned above, a cable usually comprises a plurality of fibres and, therefore, a repeater contains a plurality of circuits as described, i.e. one for each fibre. In addition the repeater comprises a common supervisory circuit 46 which monitors the functions in the repeater and provides digital signals back to land on supervisory channel 47. (Channel 47 is usually some form of time division multiplex such that data items, and data for each fibre, can be separated on land. Channel 47 may be constituted as an extra optical fibre or as a multiplex with the traffic. In many optical submarine systems it is constituted as an electrical system using the coax formed by the king wire in the centre of the cable and the tubular power conductor which surrounds the fibres and the king wire.) Conventional connections from supervisory circuit 46 to the other circuits are not shown.

In addition to the conventional components, the repeater 17 also comprises a plurality of detector filters 44, preferably surface acoustic wave filters. That is there is one filter 44 for each fibre so that the synchronisation of each fibre is individually monitored and thereby controlled. Each filter 44 has a narrow pass band at half the frequency of filter 43, i.e. the frequency defined in traces 12 and 13 of FIG. 2. The power (or some other equivalent parameter, e.g. amplitude) of the output of filter 44 is digitised in A/D converter 45 and passed to supervisory circuit 46 where it is passed to land via supervisory channel 47.

When the interlace is perfect there should be no output from filter 44 (but there is usually a little noise). If the interlace becomes uneven, e.g. as shown in FIG. 3, the power output of filter 44 increases and, therefore, larger values are returned to land on channel 47.

It should be noticed that, in FIG. 3, it is not possible to tell from which station the pulses originate. Thus the error signals specify only the magnitide of the error. The error signals do not indicate the direction of the error.

Figure 5:
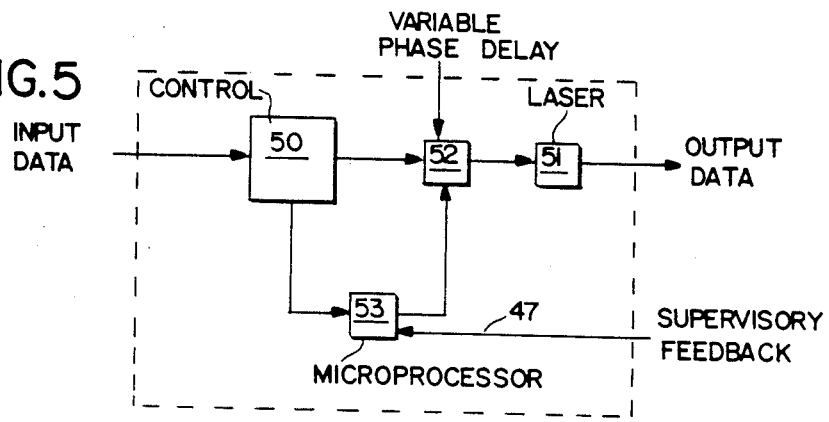
FIG. 5 illustrates a transmitter station according to the invention.

The error signals (for all the fibres) are sent, via common supervisory channel 47, to transmitter 11 and relevant parts of this are shown in FIG. 5. The major part of the station is represented by box 50 which controls an optical transmitting means, e.g. a laser 51, via a variable phase delay 52. The error signals, received via channel 47, are stored in a microprocessor 53. Since the signals do not indicate the direction of an error the microprocessor makes a small phase adjustment in a randomly selected direction, and it waits to ascertain the result of this alteration. If the error gets better the microprocessor makes a further change in the same direction to remove the error. If the error gets worse the second change is made in the opposite direction. Thus the station 11 can adjust its phase delay to keep the spacing uniform in fibre 16.

In use, the transmitter 11 forms part of a telecommunications system and it receives its traffic from the system. There will be a system specification which defines the bit rate of both the system and transmitter 11. However, the transmitter 11 cannot control the system and, in particular, transmitter 11 cannot control the phase or timing of the traffic which it receives. The output of station 11 is timed so that its signals have the correct phase relationship at the repeater 17. Thus the timing of the output is controlled (indirectly) by fixed phase station 10 and transmitter 11 has to confrom to two timing requirements neither of which it can control.

It is, therefore, convenient to include a buffer store in transmitter 11. The buffer store is connected to receive and store the traffic as it comes. The buffer is also connected to provide traffic to the cable 13 under control of a clock (i.e. one clock for each fibre) which determines the instant at which each bit is transmitted. The phase corrections which have been mentioned above are achieved by adjustments to the phase of the clocks. Since good performance requires accurate adjustment of the phase at repeater 17, each individual adjustment of a clock is a very small portion of a bit period. Thus each clock adjustment makes only a slight difference to the buffer, i.e. a very small increase or decrease in the time for which traffic remains in the buffer.

Over short periods of time, e.g. up to a few seconds, the input bit rate will be exactly matched to the output bit rate and the small clock adjustments described above have no effect on other parts of station 11 or on the input/output balance. For longer periods of time, e.g. hours or days, it is possible that the balance will not be exact. Thus over a period of one year the variations in transmission times may be of the order of about 500 bit-periods (for transmission rates of 600 Mbits/sec over distances of a few hundred miles to the mode 14). Thus the cumulative effect of many adjustments can be expected to amount to 500 bit-periods (or +250 to −250 from a mean). It would probably be inconvenient to provide a buffer store large enough to cope with this variation.

In general it is difficult to control the telecommunications system exactly to the specified bit rate so that discrepancies of similar size would be expected even without the variation in transmission times. Thus station 11 is an example of pleisiochronous operation and technology to correct the errors in pleisiochronous systems is well known. "Justification" in which non-essential bits are inserted and/or deleted as appropriate is an example of such a system.

As described above, the clocks control the phase at the repeater 17 but the cumulative effect of many small adjustments may cause the amount of traffic stored in the buffer to become inconveniently high or low. The justification system inserts a bit when the content is too low and deletes a bit when the content is too high. Thus the content of the buffer remains at a convenient level in spite of substantial cumulative effects. (The clocks and buffer are not shown in any drawing).

In a modified version (not illustrated) the direction of the correction is also determined. In this modification the amplitude of the signals in fibre 13 are kept at 99% to 95% of the amplitude of those in fibre 12. This assymetry causes a non-zero output even when the phase adjustment is perfect. The assymetry also makes it possible to derive a clock signal from the traffic signals and to measure a phase shift of the filter output against the derived clock signal. Thus error signals which include both magnitude and direction are obtained and this facilitates correction. There is a penalty in that the submerged equipment is more complex.

Figure 4:
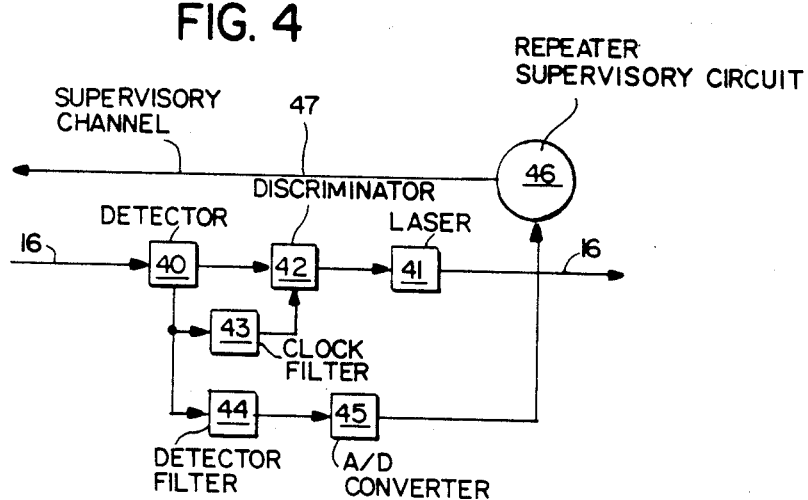
FIG. 4 illustrates a repeater according to the invention.

It is possible to combine signals from more than two stations. Thus to combine signals from four stations two pairs are combined using two junctions each with a repeater as shown in FIG. 4. The two systems are then combined using a third junction and repeater which sends its error signal to two land stations. It will be appreciated that when signals from several stations are to be combined it is necessary for the primary transmitters to use intervals which are much longer than the spaces. When there are four transmitters the intervals should be (at least) three times the pulses for interlace to be feasible.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An optical telecommunications system which comprises:
   (a) a first transmitter station for producing a first sequence of binary-valued digital bit optical pulses;
   (b) a second transmitter station for producing a second sequence of binary-valued digital bit optical pulses, said second station including variable phase delay means for adjusting the phase delay of its transmitted digital bit optical pulse signals;
   (c) a further station connected by means of optical fibre cables to said first and second transmitter stations and adapted to receive a sequence of interleaved optical pulses resulting from the combination of said first and second sequences of independent, pulsed optical traffic-signals from said first and second transmitter stations;
   wherein said further station includes
   (d) error detecting means responsive to the spacing of pulses in the first sequence as compared to those of the second sequence to provide an error signal indicative of the non-uniformity of time spacing between the interleaved pulses of said combined traffic-signals;
   (e) error signal transmission means for transmitting said error signal to the second transmitter station via said optical fibre cables;
   and also wherein said second transmitter station includes
   (f) control means adapted to receive said error signal, said control means being operatively connected to control said variable phase delay means so as to minimise the phase error indicated by the received error signal.

2. A system according to claim 1, wherein the fibre cables include a first input cable connected to the first transmitter station, a second input cable connected to the second transmitter station and an output cable connected to the further station, wherein the system includes a passive junction at which the first and second input cables are connected to the output cable.

3. A station, suitable for use in networks as the further station specified in claim 1, which further station comprises:
   (i) means for receiving pulsed optical traffic signals and converting them to electrical form;
   (ii) said error detecting means being responsive to time irregularities in said electrical signals; and
   (iii) said error signal transmission means includes means for transmitting the error signal produced by said error detecting means.

4. A station according to claim 3, wherein said error detecting means takes the form of a filter tuned to half the frequency of the pulse signals produced by said transmitter stations and an analogue to digital converter for converting the output of the filter to digital form.

5. A station according to claim 4, wherein the filter is a surface acoustic wave filter.

6. A transmitter station suitable for use in a network as the second transmitter station defined in claim 1 which transmitter station comprises:
   (I) optical transmitting means suitable for transmitting traffic into an optical fibre;
   (II) said variable phase delay means including an adjustable phase delay for adjusting the phase of the output signals of said optical transmitting means; and
   (III) said control means is adapted to receive phase error signals generated outside the transmitter station, said control means being operatively connected to said variable phase delay means for adjusting the phase delay to reduce phase errors indicated by a received signal.

7. A transmitter station according to claim 6, which comprises:
   a plurality of said optical transmitting means for transmitting bit pulse optical signal traffic into a plurality of optical fibres that are included in a submarine cable,
   each of said optical transmitting means having its own said variable phase delay means for adjusting the phase of its output signals,
   wherein the control means is adapted to receive phase error signals relating to all of said optical transmitting means and to separate said phase error signals to control each of said phase delay means by phase error data relating to its own respective transmitting means.

8. An optical telecommunications system which comprises:
   (a) a first transmitter station connected to a first input cable, said first transmitter station being adapted for the transmission of first traffic signals into said first input cable, said first signals being pulsed bit signals;
   (b) a second transmitter station connected to a second input cable, said second transmitter station being adapted for the transmission of second traffic signals into said second input cable, said second signals being pulsed, optical bit signals, wherein said second transmitter station includes variable phase delay means for adjusting the phase of said traffic signals transmitted into said second input cable;
   (c) an output cable connected at a passive junction to said first and second input cables, whereby said output cable receives composite pulsed optical traffic signals formed by bit-interleaving said first and second traffic signals;
   (d) a further station connected to said output cable so as to receive said composite signals, wherein said further station includes means for converting said composite signals to electrical form; filter means tuned to half the frequency of the bit rate in said composite signal and an analogue-to-digital converter for converting the output of said filter to digital form and transmission means for transmitting said digital form to the second transmitter station via said output and second input cables;
and also wherein said second transmission station includes
(e) control means adapted to receive said digital signals, said control means being operatively connected to control said variable phase delay means so as to minimise the output of said filter means as indicated by said digital signal.

* * * * *